(12) United States Patent
Lazarus (10) Patent No.: US 9,430,456 B2
(45) Date of Patent: Aug. 30, 2016

(54) SYSTEM FOR ENTERING DATA INTO A DATA PROCESSING SYSTEM

(71) Applicant: Transaxy Inc., Thornhill (CA)

(72) Inventor: Russell Lazarus, Thornhill (CA)

(73) Assignee: Transaxy Inc., Thornhill, ON (CA)

( * ) Notice: Subject to any disclaimer, the term of this patent is extended or adjusted under 35 U.S.C. 154(b) by 0 days.

(21) Appl. No.: 14/344,787

(22) PCT Filed: Aug. 9, 2013

(86) PCT No.: PCT/CA2013/000702
§ 371 (c)(1),
(2) Date: Mar. 13, 2014

(87) PCT Pub. No.: WO2014/022919
PCT Pub. Date: Feb. 13, 2014

(65) Prior Publication Data
US 2015/0019413 A1    Jan. 15, 2015

Related U.S. Application Data (60) Provisional application No. 61/681,736, filed on Aug. 10, 2012.

(51) Int. Cl.
| | |
|---|---|
| G06F 17/00 | (2006.01) |
| G06F 17/24 | (2006.01) |
| G06Q 30/04 | (2012.01) |
| G06F 17/30 | (2006.01) |
| G06K 9/20 | (2006.01) |
| G06F 3/0484 | (2013.01) |
| G06F 3/0488 | (2013.01) |
| G06Q 20/10 | (2012.01) |
| G06K 9/62 | (2006.01) |

(52) U.S. Cl.
CPC ........... *G06F 17/243* (2013.01); *G06F 3/0488* (2013.01); *G06F 3/04845* (2013.01); *G06F 17/30011* (2013.01); *G06K 9/2081* (2013.01); *G06K 9/6253* (2013.01); *G06Q 20/10* (2013.01); *G06Q 30/04* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 4,933,979 A | 6/1990 | Suzuki et al. | |
| 5,317,646 A | 5/1994 | Sang, Jr. et al. | |
| 6,122,647 A * | 9/2000 | Horowitz et al. | 715/205 |
| 6,353,840 B2 | 3/2002 | Saito et al. | |
| 6,360,011 B1 | 3/2002 | Katsumata et al. | |
| 6,400,845 B1 * | 6/2002 | Volino | 382/176 |
| 6,782,144 B2 | 8/2004 | Bellavita et al. | |
| 7,085,437 B2 | 8/2006 | Nakajima et al. | |

(Continued)

FOREIGN PATENT DOCUMENTS

CA    2071899    7/1991

*Primary Examiner* — Hien Duong
(74) *Attorney, Agent, or Firm* — Kagan Binder, PLLC (57) ABSTRACT

The present invention is a data entry system for extracting data from an image. The system displays a number of data capture windows corresponding to data fields employed in a data processing application, such as accounting software. The system allows the user to position the capture windows over the associated data in the image and automatically extracts the digital string under the window as the value of the associated data field. The system then submits all the data field values to the data processing application as if the user had entered them directly into a data entry screen in the data processing application.

37 Claims, 4 Drawing Sheets

(56) References Cited

U.S. PATENT DOCUMENTS

| | | | |
|---|---|---|---|
| 8,351,703 B2* | 1/2013 | Jain et al. | 382/190 |
| 2003/0036912 A1 | 2/2003 | Sobotta et al. | |
| 2003/0197736 A1 | 10/2003 | Murphy | |
| 2004/0103367 A1 | 5/2004 | Riss et al. | |
| 2004/0181749 A1* | 9/2004 | Chellapilla et al. | 715/505 |
| 2006/0190489 A1 | 8/2006 | Vohariwatt et al. | |
| 2007/0033544 A1* | 2/2007 | Fleisher et al. | 715/800 |
| 2007/0294630 A1* | 12/2007 | Duncan et al. | 715/764 |
| 2009/0092318 A1* | 4/2009 | Berard et al. | 382/176 |
| 2009/0158090 A1* | 6/2009 | Bauchot et al. | 714/15 |
| 2009/0168090 A1* | 7/2009 | Nakano et al. | 358/1.13 |
| 2009/0172575 A1* | 7/2009 | Nakano et al. | 715/764 |
| 2010/0094888 A1* | 4/2010 | Schiehlen | G06K 9/033 707/758 |
| 2011/0138314 A1* | 6/2011 | Mir et al. | 715/779 |
| 2011/0249905 A1 | 10/2011 | Singh et al. | |
| 2011/0255782 A1 | 10/2011 | Welling et al. | |
| 2011/0255784 A1 | 10/2011 | Welling et al. | |
| 2012/0010995 A1* | 1/2012 | Skirpa | G06F 3/0481 705/14.49 |
| 2012/0107789 A1* | 5/2012 | Desruisseaux | 434/362 |
| 2012/0144286 A1* | 6/2012 | Bank et al. | 715/230 |
| 2013/0022284 A1* | 1/2013 | Zheng | 382/229 |
| 2013/0151939 A1* | 6/2013 | Proux et al. | 715/212 |
| 2013/0246914 A1* | 9/2013 | Millefiorini et al. | 715/268 |
| 2013/0318426 A1* | 11/2013 | Shu et al. | 715/226 |

* cited by examiner

SYSTEM FOR ENTERING DATA INTO A DATA PROCESSING SYSTEM

RELATED APPLICATION

This application claims the benefit from International Application No. PCT/CA2013/000702, filed Aug. 9, 2013, which in turn claims the benefit of U.S. Provisional Patent Application Ser. No. 61/681,736, filed Aug. 10, 2012, which applications are incorporated herein by reference in their entireties.

FIELD OF THE INVENTION

The present invention relates generally to methods and systems for entering data into a data processing system, and more particularly to methods and systems for entering data into a data processing system where the data is extracted from an image.

BACKGROUND OF THE INVENTION

Many computer data processing applications are available for running on computers to manage data for various purposes. Many such data processing applications are adapted for specific purposes, such as accounting. An accounting data processing application generally provides data entry screens with a number of particular application data fields into which users enter data values. For example, one screen may be for entering data from vendor invoices. Typically, the screen will have application data fields such as vendor name, date, amount payable, invoice no. and description of the item(s) purchased. A user will generally receive invoices in paper form, or as an image via email or a website, and transcribe the values in the image fields corresponding to the application data fields and instruct the data processing application to store the data in its database. Examples of such programs include QuickBooks™ and Sage 50™.

This results in various problems. The transcription of data from an input form is time-consuming and error-prone. Even if the user is provided with an electronic copy of the form, the data is generally stored in an image so that the user cannot copy and paste the values of the image fields. Programs are available to perform optical character recognition (OCR) to convert the image field content to digital strings, but the process of performing OCR and copying the digital data corresponding to each application data field can be more time consuming than just entering the data by using the keyboard. Also, there is no simple means to retain the image file so that when the user is displaying data within the data processing application the user can readily pull up the image file in case the user needs to check some values or add additional information that was on the form but not entered, since the data processing application knows nothing about the image file.

SUMMARY OF THE INVENTION

The following presents a simplified summary of the disclosure in order to provide a basic understanding to the reader. This summary is not an extensive overview of the disclosure and it does not necessarily identify key/critical elements of the invention or delineate the scope of the invention. Its sole purpose is to present some concepts disclosed herein in a simplified form as a prelude to the more detailed description that is presented later.

It is an object of the invention to provide a technical solution to address some of the problems described above.
Embodiments with at Least One Data Capture Window The present invention is a data entry system for extracting data from an image displayed on a screen, and associating the extracted data with application data fields, values of which application data fields a data processing application is adapted to receive, each application data field having a field name, wherein the image comprises an image field, the image field being a portion of the image containing image field data, the data entry system comprising a software application running on a computer processor, the software application being adapted to:

(a) display a movable data capture window on the screen, the data capture window comprising a capture data field area;

(b) permit the user to drag the data capture window over the displayed image so that the image field data in the image field in the displayed image is under the capture data field area of the data capture window;

(c) convert the image field data to a digital string;

(d) receive an indication of the field name of the application data field that corresponds to the image field data; and (e) associate the digital string with the field name of the indicated application data field to create application data field information.

The image may include a form, which may be a type of form for which the data processing application provides a data entry screen to enter application data field values based on image field data in the form, and the software application may directly provide the application data field information to the data processing application, indicating to the data processing application that the digital string is a value of the application data field with the field name associated with the digital string, and instruct the data processing application to store the digital string in the same manner as would be done if the user had entered the digital string into a data entry field corresponding to the associated field name in the data entry screen.

The capture data field area of the data capture window may be transparent so that, after the user drags the data capture window over the displayed image, the image field data in the image field in the displayed image is visible in the transparent capture data field area of the data capture window.

The portion of the image under the capture data field area of the data capture window may be displayed to the user in a portion of the screen separate from the portion in which the image is displayed. The digital string may be displayed to the user in a portion of the screen separate from the portion in which the image is displayed.

The image field data in the image field may comprise a character string, where each character is a letter, number, space, newline character or other symbol. The conversion of the character string to the digital string may be done using optical character recognition.

The transparent capture data field area of the data capture window may be rectangular, having a width and a height, and the data capture window may be resizable so that the user can change the width and height of the transparent capture data field area.

The software application may permit the user to confirm that the data capture window is correctly placed and sized prior to converting the image field data to a digital string. The data capture window may comprise an indication of the field name of one of the application data fields, and the placement of the data capture window over the image field data in the displayed image may comprise the indication of the field name of the application data field that corresponds to the image field data, the type being the field name indicated by the data capture window. The indication of the field name of one of the application data fields may comprise an icon positioned near to the capture data field area or text positioned near to the capture data field area.

The data processing application may maintain a list of previously entered values for the application data field that corresponds to the image field data, and the software application may be further adapted to retrieve the list of previously entered values, determine which value in the list is closest to the digital string, display the closest value, and give the user the option to confirm that the closest value is correct and that it should be entered into the data processing application. The software application may be further adapted to display a list of previously entered values of the application data field, wherein the closest value is highlighted in the list, and the user may be given the option to select a different value displayed in the list.

The direct provision of the application data field information to the data processing application may be facilitated by use of a software development kit provided by the maker of the data processing application.

Embodiments with More than One Data Capture Window

The present invention also provides a data entry system for extracting data from an image displayed on a screen, and associating the extracted data with application data fields. A data processing application is adapted to receive the values of the application data fields. Each application data field has a field name. The image is a depiction of a form having a form type and having N image fields. Each image field is a portion of the image containing image field data and N is an integer greater than or equal to two. The N image fields correspond to N application data fields associated with the form type within the data processing application. The software application is configured to:
  (a) display N movable data capture windows on the screen, each data capture window comprising a capture data field area, and an indication of the field name of one of the application data fields;
  (b) for each data capture window, permit the user to choose the data capture window and drag the data capture window over the displayed image so that the image field data in one of the image fields in the displayed image is under the capture data field area of the data capture window, the choice of data capture window with the indication of the field name of one of the application data fields indicating that image field data contains information corresponding to the application data field having the field name indicated in the chosen data capture window;
  (c) for each image field under one of the data capture windows, convert the image field data in the image field to a digital string; and
  (d) associate each digital string with the indicated field name of the application data field to create application data field information.

The software application may directly provide the application data field information to the data processing application, indicating to the data processing application that each digital string is a value of the application data field with the field name associated with the digital string in the application data field information, and instruct the data processing application to store the digital strings in the same manner as would be done if the user had entered each digital string into a field corresponding to the associated field name in a data entry screen provided by the data processing application for the form type.

The system may also permit the user to designate a portion of the displayed image as one of the image fields by touching a point on the screen to indicate where the image field is located, and then automatically display a data capture window encompassing the touched point.

The capture data field area of each data capture window may be transparent so that, after the user drags one of the data capture windows over the image field data in the image field, the image field data is visible in the transparent capture data field area of the data capture window.

If the user moves or scrolls the displayed image, the data entry system may automatically move the data capture windows placed over the displayed image so that the each data capture window remains in the same position relative to the image field data while the portion of the image containing the image field data under the data capture window is displayed. If the image field containing the image field data under the data capture window is scrolled so that it is no longer displayed on the screen, the data entry system may discontinue displaying the data capture window, and if the image field containing the image field data that was previously under the data capture window is scrolled back onto the screen, the data entry system may again display the data capture window over the image field data with the image field data visible in the transparent capture data field area of the data capture window.

The conversion of the image field data to the digital strings may be done using optical character recognition.

The transparent capture data field area of each data capture window may be rectangular, having a width and a height, and each data capture window may be resizable so that the user can change the width and height of the transparent capture data field area.

The software application may permit the user to confirm that the data capture windows are all correctly placed and sized prior to converting the image field data to digital strings.

The software application may permit the user to confirm that the digital strings are all correct prior to providing the digital strings to the data processing application.

The data processing application may be financial accounting software, and the form type may be a vendor invoice.

One of the application data fields may be vendor name and another of the application data fields may be amount charged, and the digital string corresponding to the vendor name may comprise the name of a vendor of a product, and the digital string corresponding to the amount charged may be an amount of money payable to the vendor in respect of the product.

The data entry system may maintain a database of images used to extract the digital strings that were provided to the data processing application in the application data field information, along with the locations of the data capture windows when the system converted the image field data to the digital strings. The system may generate a unique image identifier for each image, and provide the image identifier as part of the application data field information to the data processing application for entry in an auxiliary application data field, and wherein, when the data processing application is displaying data that was derived from an image processed by the data entry system, the user may be able to request that the system display the image and the system may then retrieve the corresponding image from the image file database and display the image. The image identifier may be entered into an application data field that is displayed by the data processing application when data extracted from the image is displayed, and the system may automatically extract the image identifier and use it to retrieve the corresponding image from the image file database. When the system displays the image, it may also display the data capture windows in the positions they were when the system converted the image field data to the digital strings. The system may permit the user to move and resize the data capture windows, after which the system may convert the image field data to digital strings and directly provide the application data field information to the data processing application, to replace the application data field information that was previously entered.

Embodiments Where the User May Designate an Image Field Point

The invention also provides a data entry system for extracting data from an image displayed on a screen viewable by a user and associating the extracted data with application data fields, values of which application data fields a data processing application is configured to receive, each application data field having a field name, wherein the image comprises one or more than one image field, each of the image fields being a portion of the image containing image field data, the data entry system comprising a software application running on a computer processor, the software application being configured to:

permit the user to designate a portion of the displayed image as one of the image fields;

convert the image field data in the designated image field to a digital string;

receive an indication of the field name of the application data field that corresponds to the image field data; and associate the digital string with the indicated field name of the application data field to create application data field information.

Permitting the user to designate a portion of the displayed image as one of the image fields, as in the previously described embodiments, may be done by displaying a movable data capture window on the screen, the data capture window comprising a capture data field area, and permitting the user to drag the data capture window over the displayed image so that the image field data in the image field in the displayed image is under the capture data field area of the data capture window.

Alternatively or additionally, permitting the user to designate a portion of the displayed image as one of the image fields may be done by the user touching or otherwise indicating a point on the screen to indicate where the image field is located. The system may analyze the data in the image near the indicated image field point point and automatically draw a data capture window on the screen surrounding the indicated image field point point, the data capture window comprising a capture data field area, and the system may also permit the user to resize the data capture window to ensure that all the image field data is visible in the capture area data field. The system may employ optical character recognition to analyze the image data.

The present invention further includes non-volatile and non-transitory computer-readable memories that have the software applications described above stored therein.

In all embodiments, the invention may further include a computer processor capable of running the software application and a non-transitory computer-readable memory containing the software application.

BRIEF DESCRIPTION OF THE DRAWINGS

FIG. 3 is an example of a screen showing the use of an embodiment of the invention displaying an image of a vendor invoice and five data capture windows where all five data capture windows have been placed over the image.

DETAILED DESCRIPTION OF THE INVENTION

The invention provides a data entry system. Each embodiment of the data entry system is generally adapted to work with a specific data processing application, such as a particular financial accounting program. The data entry system may support all the input form types associated with that data processing application. Examples of input form types are "vendor invoice", "sales order", and "cheque". Each form type has a particular set of application data fields, each having a field name used by the data processing application in associated data entry screens that is unique within the form type. For example, an "enter bill" screen, for entering the information contained in an invoice received from a vendor or supplier, might have application data fields named "vendor name", "date", "total amount charged", "item description", "item price", and "invoice number". In order to allow for bills with multiple items, the fields could alternatively be named, for example, "product description n", "item price n", where n in an integer, although, for simplicity, we will generally assume herein that an invoice has only one item listed in it. Each item may be a product or service, which terms will be used interchangeably herein.

Figure 1:
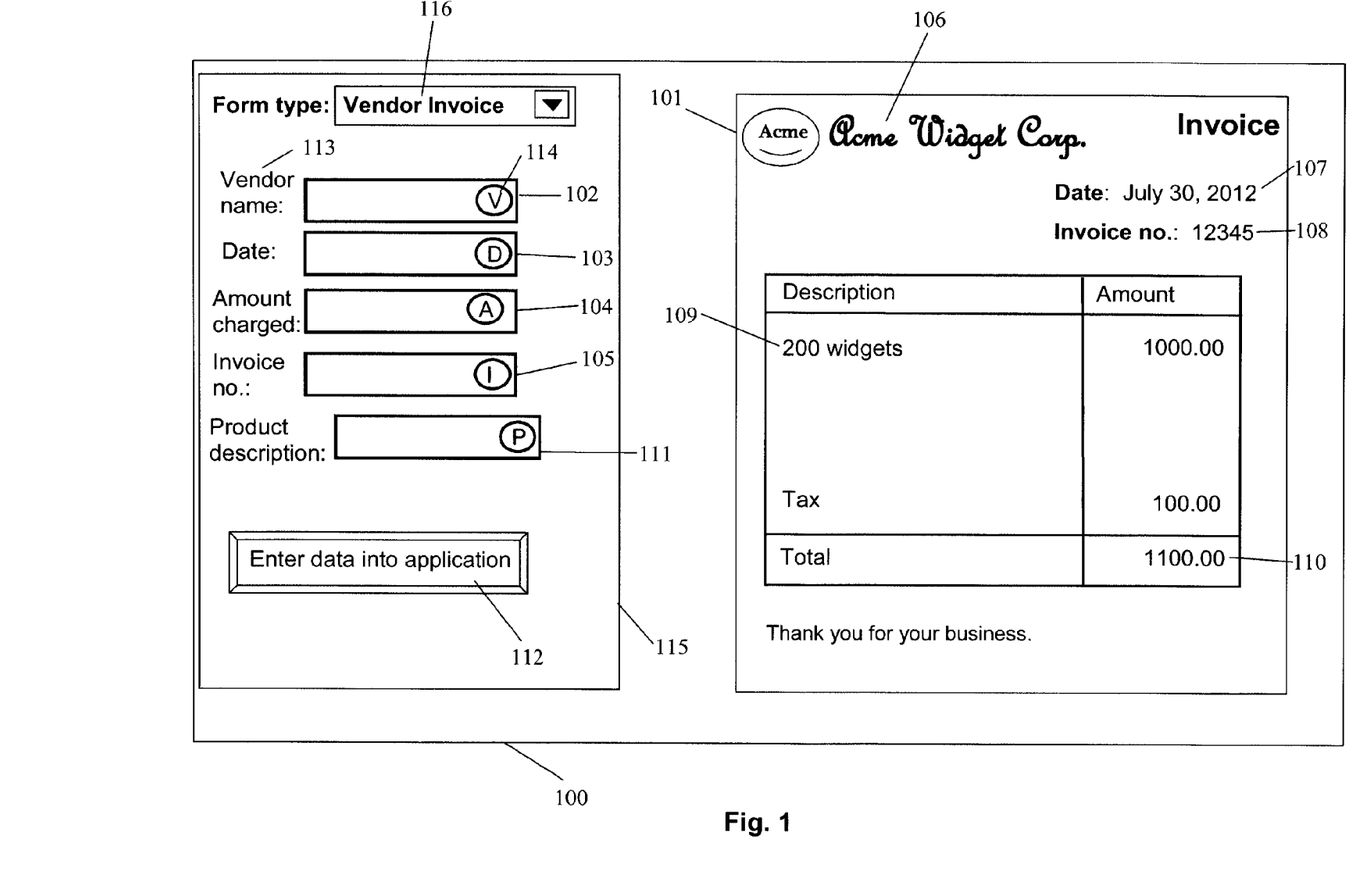
FIG. 1 is an example of a screen showing the use of an embodiment of the invention displaying an image of a vendor invoice and five data capture windows where none of the data capture windows have been placed over the image.
Figure 2:
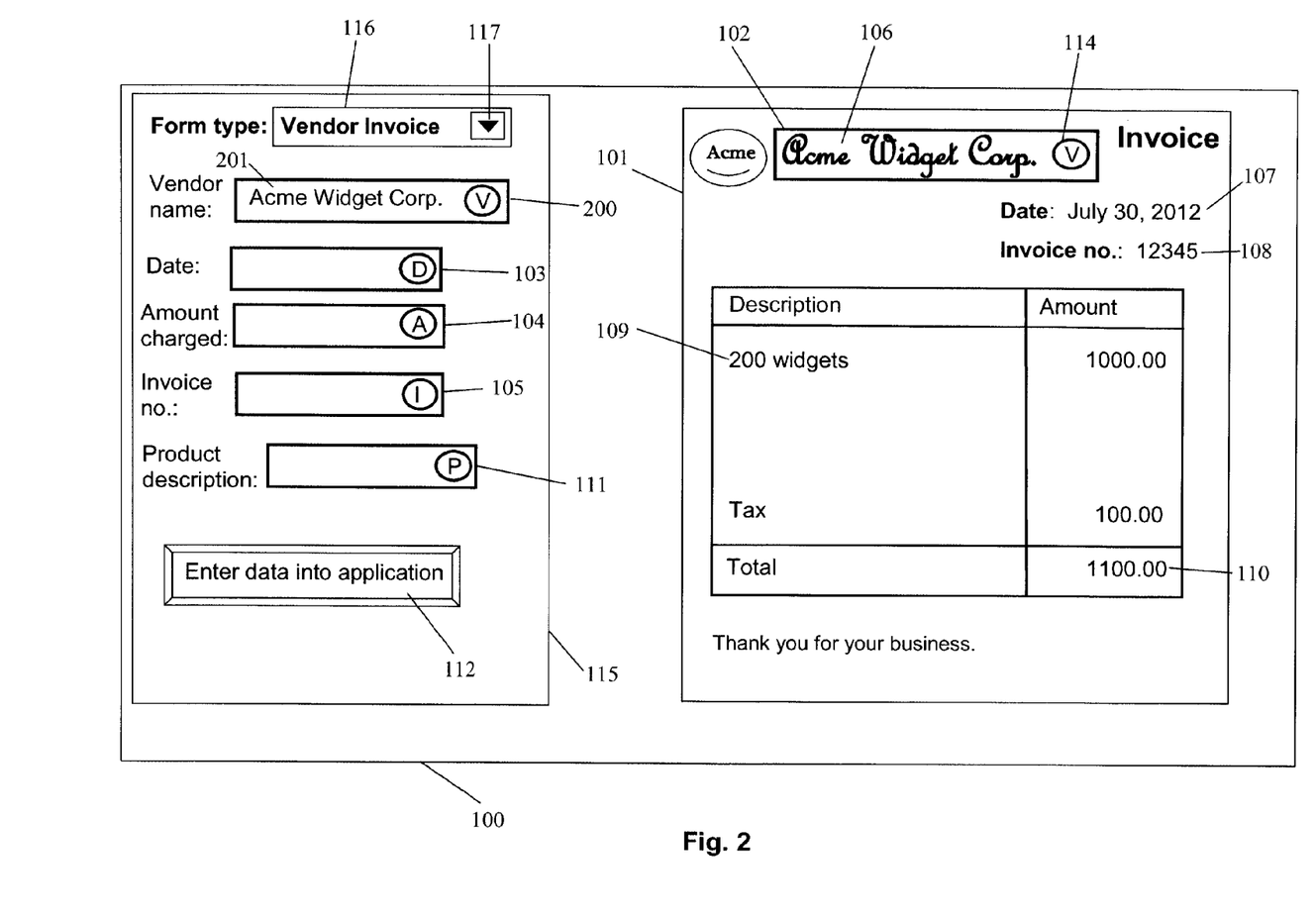
FIG. 2 is an example of a screen showing the use of an embodiment of the invention displaying an image of a vendor invoice and five data capture windows where one of the data capture windows has been placed over the image.

FIGS. 1-3 show examples of three screens showing the use of one embodiment of the invention. An image of a vendor invoice 101 is being displayed on a computer screen 100 to a user, and the user has run an instance of the data entry system and informed the data entry system that the user wishes to process an invoice provided by a vendor by selecting the "Vendor Invoice" form type from a drop-down list 116. The data entry system has displayed a window 115 containing five invoice data capture windows 102, 103, 104, 105, 111 associated with the vendor invoice form type in the window 115 beside the image 101.

The image 101 of the invoice being displayed may have been provided to the user by email or retrieved from a website as, for example, a TIFF (Tagged Image File Format) or JPEG (Joint Photographic Experts Group format) file. Alternatively, the user may have received a paper invoice and converted it to a digital image using a scanner. It is generally assumed herein that the information in the image files is in a raster format, but the information alternatively could be stored in a file containing digital strings positioned in the display by mark ups. The image 101 may have been displayed by the user using any image display software application that supports the image format of the image 101. In some embodiments, the data entry system may handle the display of the image 101 for example by the user selecting an "open image" function from a menu, or by dragging the image file over a window being displayed by the data entry system.

The image 101 contains a number of image fields, each image field being a portion of the image that contains image field data representing human readable information, such as the vendor's name 106. In some embodiments, the data entry system may also support image field data that is machine readable, such as barcodes. Such human readable image field data will generally represent a string of characters, such as letters, numbers, spaces, newline characters and other symbols, although it could include graphics. For example, a company may not include its name in a readily comprehensible character string, but may rather include a graphic that is well known to be associated with the company (although the vendor's name is normally also provided in a character string corresponding to the vendor's legal name). In the form image 101 shown in FIG. 1, the image fields include vendor name 106, date 107, invoice no. 108, product description 109, and total amount payable 110.

Without the present invention, if the user wants to enter the data from the invoice into the data processing application, the user will run the data processing application, bring up the "enter bill" screen, or the equivalent, and then transcribe the character strings from each image field corresponding to an application data field into the corresponding application data field in the "enter bill" screen, and then instruct the data processing application to save the information. Using the present invention, the user would instead run an instance of the data entry system, which either determines the type of form being displayed, or is told the form type by the user, and then the data entry system presents a window 115 to the user containing a number of data capture windows 102, 103, 104, 105, 111, each data capture window corresponding to one application data field associated with the specified form type, along with an indication of which application data field each is associated with. The indication may be a text string 113, which may be the field name, placed beside the data capture window 102, or an icon 114, both a text string 113 and an icon 114 (as shown in FIG. 1), a tooltip or any other suitable means. Each data capture window comprises a border, which is preferably rectangular, and a capture data field area, being the rectangular area inside the border. Generally the system will provide one data capture window for every application data field associated with the data entry screen(s) of the data processing application related to the type of form being processed. Data capture windows corresponding to one or more of the application data fields for the form type are initially displayed by the system. Others may also be displayed, or the user may be presented with a list of application data fields that can be selected, for example from a drop-down list, in order to cause the system to create an associated data capture window that is then displayed on the screen.

The data capture windows are placed on the screen, generally in a window 115 beside the image, assuming that there is room. If the image takes up the whole screen, the data capture windows may be placed beside one edge of the image 101, preferably in an area without text in that portion of the image 101. The user may choose a data capture window, for example, by putting the cursor over it and left-clicking a mouse button. The user may then drag the chosen data capture window over the image 101 by holding down the left button while moving the mouse. In preferred embodiments, the capture data field area is transparent, so that when the data capture window is over the image 101, the user can see the image data under the capture data field area inside the border of the data capture window. By transparent, it is meant that the image field data is clearly visible to the user in the capture data field area of the data capture window. For example, the system may associate colours with the different application data field types and show each capture data field area shaded in a colour corresponding to the type (name) of the application data field associated with the data capture window.

After choosing a data capture window, such as the "vendor name" data capture window 102, the user can drag it (for example, by holding the left key of the mouse down while moving the mouse) over the image field 106 corresponding to the vendor name, as shown in FIG. 2. The image field data, which is the vendor's name, "Acme Widget Corp.", is visible in the transparent capture data field area of the data capture window 102. The data capture windows are also resizable so that the user can adjust the size (e.g. by clicking on the border and dragging one of the horizontal or vertical border lines) so that only the image field data corresponding to the chosen "vendor name" application data field is visible, and so that all of the image field data corresponding to the chosen "vendor name" application data field is visible. The data entry system may automatically OCR the image field data and convert it to a digital string after the user stops moving or resizing the data capture window. Alternatively, the system may wait until the user indicates that OCR should be performed, for example by clicking on the "vendor name" icon 114, or clicking on a control that instructs the system to OCR the data in all the capture data field areas.

It should be noted that it is not essential that the system provide an indication of which application data field each data capture window is associated with. For example, generic data capture windows could be provided, each having a drop-down menu listing the available field names, from which the user could select the one that corresponds to the image field data above which the user placed the data capture window. Various other methods for the user to provide an indication of the application data field are also possible, although selection of a data capture window with an indication of an application data field name associated with it is generally preferred.

In the embodiment shown in FIG. 2, the system leaves a copy 200 of the data capture window in the initial position, and, after it performs OCR, it displays the resulting digital string 201 in the copy 200. This allows the user to check that the digital string has been correctly extracted, and the user can edit the string in the copy 200 of the data capture window to correct any errors. The image field data 106, which in this case is in a script font, remains visible in the capture data field area. Alternatively, the system may render the capture data field area in the data capture window 102 over the image non-transparent and display the extracted digital string 201 in the capture data field area, and allow the user to edit it there, if required. This is generally done by default in embodiments that do not leave a copy 200 of the data capture window in the initial position or otherwise display the extracted digital string 201 in a separate screen location. Some embodiments may provide an option for the user to switch between showing the actual image field data under the data capture windows that are placed over the image 101 in the capture data field area and showing the extracted digital string. By rendering the capture data field area non-transparent, it is meant that the image field data can no longer be seen in the capture data field area, so that it does not interfere with the display of the digital string in the capture data field area.

The user can then do the same thing for the other data capture windows, as shown in FIG. 3, where: (1) the date data capture window 103 has been placed over the image field data containing the date 107 and a copy 300 of the date data capture window 103 is displayed in the initial position of the date data capture window 103 with the extracted digital string displayed in the copy 300 of the date data capture window; (2) the amount charged data capture window 104 has been placed over the image field data containing the amount charged 110 and a copy 301 of the amount charged data capture window 104 is displayed in the initial position of the amount charged data capture window 104 with the extracted digital string displayed in the copy 301 of the amount charged data capture window; (3) the invoice number data capture window 105 has been placed over the image field data containing the invoice number 108 and a copy 302 of the invoice number data capture window 105 is displayed in the initial position of the invoice number data capture window 105 with the extracted digital string displayed in the copy 302 of the invoice number data capture window; and (4) the product description data capture window 111 has been placed over the image field data containing the product description 109 and a copy 303 of the product description data capture window 111 is displayed in the initial position of the product description data capture window 111 with the extracted digital string displayed in the copy 303 of the product description data capture window. After the user is satisfied that the correct data has been captured in the displayed digital strings in the copies of the data capture windows, the user can push a button marked "Enter data into application" 112 to instruct the data entry system to provide the form data to the data processing application.

There are various alternative methods to display the extracted digital strings to the user for verification. As discussed above the strings can be displayed in the data capture windows over the image 101 with an option to toggle between displaying the digital strings and the underlying image field data. Alternatively, the digital strings may be displayed in a separate portion of the screen with an indication of the field name associated with each extracted digital string.

In some cases, application data field values may be required or desired that are not present in the image. For example, the user may want to enter a "memo" field to store a note about the transaction in the data processing application along with the extracted values. This is handled by presenting a data capture window for such fields, either by default or after the user selects such a field from a list, and allowing the user to enter text into the data capture window directly.

For each image, the data entry system (DES) generates a DES image number, which is unique to that image. The system associates the DES image number with an auxiliary application data field in the data processing application. Such applications generally provide such fields for users to enter whatever data they choose, such as a note or "memo" about the transaction. For example, the system may append the image number to any text the user has entered into the memo field, separated from the entered text by a tilde or other special character that is unlikely to appear in the text entered by the user. The system may also generate a unique transaction number so that one image could be associated with multiple transaction numbers if the user processes the image multiple times, e.g. to correct errors in the extracted digital strings or to extract digital strings for application data fields that were missed in a previous session.

Figure 4:
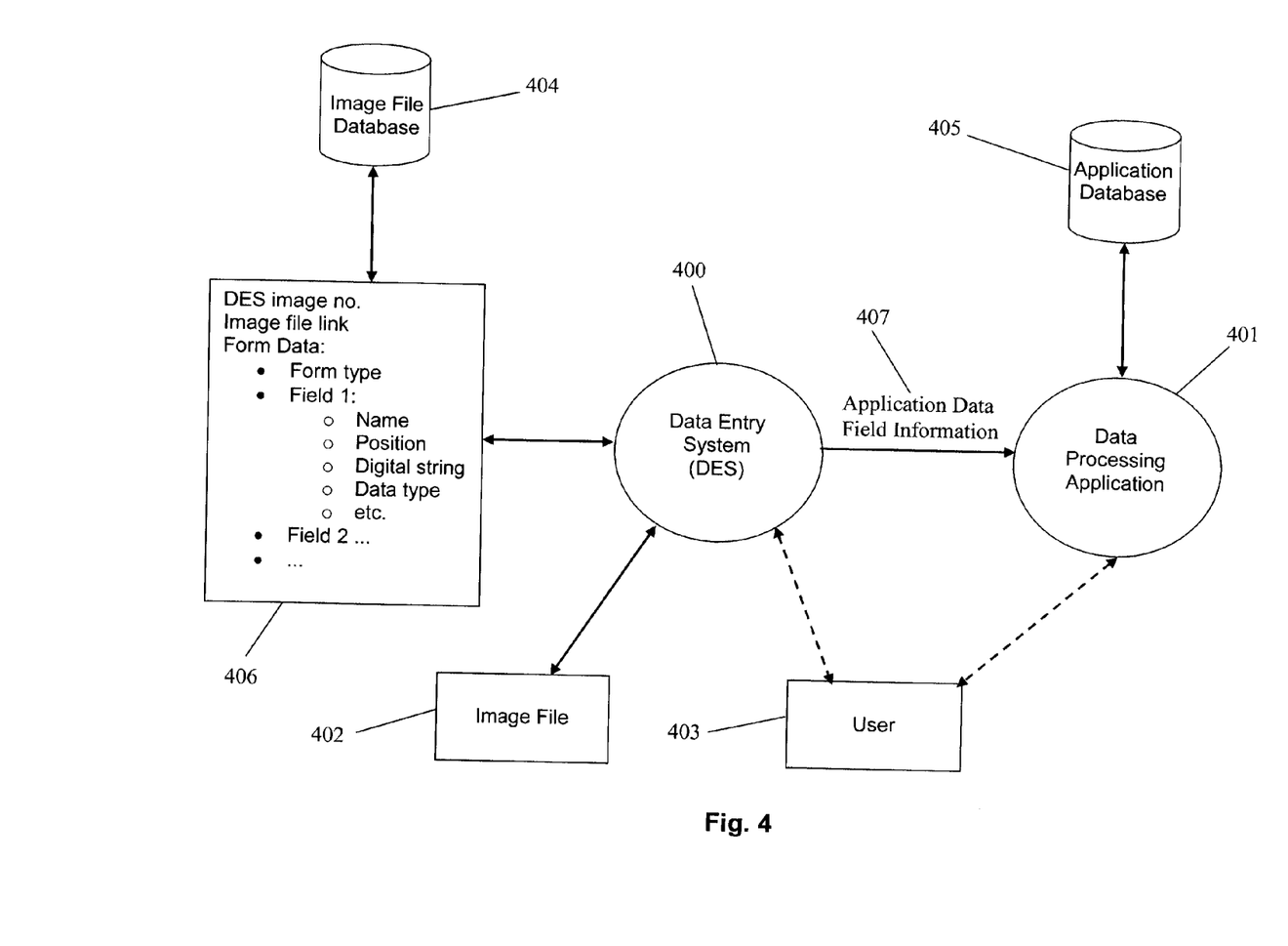
FIG. 4 is a context diagram showing the major data flows associated with an embodiment of the data entry system.

The system then associates each digital string with the field name of the application data field indicated by the user to be associated with the image field data from which the digital string was extracted. This may be done, for example, by forming application data field information 407 that is an Extensible Markup Language (XML) string specifying the digital strings and associated field names, or some codes corresponding to each field name. In preferred embodiments, the DES image number is provided in the application data field information 407 as (part of) the digital string associated with the selected auxiliary field, such as at the memo field.

In preferred embodiments, the association is done in a manner that produces application data field information 407, such as an XML string, that can be directly provided to the data processing application and the system directly provides the application data field information 407 to the data processing application, the application data field information 407 indicating to the data processing application the field name associated with each digital string, and instructs the data processing application to store the digital strings in the same manner as would be done if the user had entered the digital strings into a data entry screen provided by the data processing application for the form type.

Vendors of data processing applications often provide a software development kit and an Application Programming Interface (API) specification that permits the direct provision of digital strings to populate application data fields. It may also permit the extraction of information stored in the application database, such as a list of previously entered values for fields, such as vendor name. The term "data processing application" as used herein is limited to software applications that permit such direct entry of form data by another software application, although this does not necessarily require the provision of a software development kit.

Data processing applications often maintain a list of previously entered values, such as the vendor name. When the system converts the information in an image field into a digital string, it may retrieve the list of vendor names from the data processing application and find the saved vendor name that is closest to the digital string. If one saved value is sufficiently close, e.g. if the digital string is a substring of the value, or perhaps a substring with one character differing, or with more than one character differing, then the system may display the closest value, and give the user the option to confirm that the closest value is correct and that it should be entered into the data processing application. The system may display a list of previously entered values of the application data field to the user, with the closest value highlighted in the list, and give the user the option to select a different value displayed in the list. If none of the previously entered values is sufficiently close, the system may just display the extracted digital string, and give the user an option, such as by a control next to the displayed digital string, to open a drop-down list of previously entered vendor names so that the user can select one. Alternatively, the user may just edit the digital string to be the correct value.

In some cases, the digital string may be close to multiple previously entered values. For example, it may be a substring of three saved values, all of which are affiliated companies. In that case, the system may display or highlight all three values and ask the user to select one, or if none is correct, to select another name in the list.

As shown in FIG. 4, the image file database 404 maintained by the data entry system 400 contains an image record 406 for each image file 402 processed by the system 400. The image record 406 contains the DES image number along with either a link to the image data file 402, or a copy of the image. The record 406 may also contain an indication of the type of form in the image and a set of field data. The field data may contain, for each image field, the field name, the position of the associated data capture window on the image (e.g. row and column number for each of the upper left and lower right corners of the data capture window, where the data capture windows are rectangular) when the digital string was extracted, and the digital string.

The image record 406 may contain other information, such as the date(s) and time(s) the digital strings were extracted and the application data field information 407 provided to the data processing application, and one or more transaction numbers with associated dates. A data type of each field (e.g. date, currency, or text) may also be included.

In some embodiments, the system may support "images" that consist of digital data, such as a word processor document or a spreadsheet worksheet. In that case, the extraction of the digital string generally involves simply copying the digital value in the capture data field area. Alternatively or additionally, the system may extract associated data, such as the formula used to calculate the value in a spreadsheet cell, which may also be stored in the image record 406.

When the user 403 is using the data processing application 401 and the data processing application 401 is displaying a screen containing data that was extracted from an image by the data entry system 400, the data entry system 400 may give the user 403 an option to recall the image from which the data was extracted. This may be done by presenting a button that the user 403 can click on. When the user 403 makes such a request, the data entry system 400 first determines the DES image number of the subject image. This may be done by extracting the number from the displayed screen if the auxiliary field corresponding to the DES image number is being displayed. Alternatively, the data entry system 400 may be able to retrieve the DES image number using the API provided by the vendor of the data processing application.

The data entry system 400 then retrieves the image record 406 that is indexed by the DES image number and displays the image, either using the stored image file link, or by retrieving the image data from the image file database 404. Optionally, the data entry system 400 uses the stored form data to position data capture windows at each location at which a digital string was extracted from image field data under one of the capture data field areas. The digital strings, which are stored in the image record 406, may be displayed as described above, preferably separately from the image. It is generally preferred that the capture data field area of the data capture window is transparent so that the user 403 can see the actual image field data that was used to extract the digital strings, and adjust the size or position of the data capture windows, if necessary to capture all and only the desired contents of the corresponding application data fields. Once the user has made any adjustments, the user 403 can again instruct the data entry system 400 to send the revised application data field information 407 to the data processing application 401, instructing the data processing application 401 to replace the previously entered application data field information 407.

Although it is preferred that the data capture windows be rectangular, in some embodiments the user may have the option to modify the shape, e.g. to allow a data capture window to be a number of adjacent rectangular areas of differing sizes, or to be circular or oval, for example. Such flexibility is useful where the image field data that needs to be extracted is irregularly placed and near other elements in the image that the user does not want to capture.

In some embodiments, the data entry system may automatically analyze the displayed image, such as the vendor invoice 101 shown in FIGS. 1-3, performing optical character recognition, and look for keywords to attempt to determine which type of form is displayed in the image, and then present an appropriate set of data capture windows to the user. In this case, where the invoice has the word "invoice" in it, the data entry system would find the word "invoice" and make the assumption that an invoice from a vendor is to be processed. If this were incorrect, the user could inform the data entry system of the correct form type using the drop-down list 116 of supported form types by clicking on the drop-down control 117. The system may further automatically place each data capture window on top of the image field that the system has determined corresponding to the application data field associated with the data capture window, and size the data capture window so that all and only the text corresponding to the presumed field value is under and displayed in the capture data field area. The digital strings for each field may then be automatically extracted and displayed, for example, in copies of the data capture windows 200, 300, 301, 302, 303, that are displayed separately from the image 101. In the best case, where the digital strings are all correct, the user need only confirm this by pushing the "Enter data into application" button 112, and the system will submit the digital strings with their corresponding application data field names, along with a DES image number, as application data field information. If any of the values are incorrect, the user can edit them. If any of the fields are incorrectly placed, the user can move and resize them to capture the correct digital strings.

In some embodiments, the system may learn about and store data capture information about specific types of forms. For example, the system may record the types and positions of each data capture window for a vendor invoice from vendor A, or may perhaps identify three classes of vendor invoices from vendor A. The system may record, for each learned form, identifying information that indexes the form, such as the location of the word "invoice" and of the vendor name or logo. Then, when the system sees an image, it can analyze it to see if it corresponds to any of the learned forms by looking for the identifying information, and if so it places the data capture windows that were learned for that form over the image in exactly the same manner as was learned, having been approved by the user when processing a prior version of the form prior to submitting the application data field information 407 to the data processing application 401. Then the user simply has to verify and confirm to the system that the digital strings are correct.

The type of form in an image may also be encoded in the image in a machine-readable manner, such as a barcode, the contents of which could alternatively be used to index a form type.

In some embodiments, if the user moves or scrolls the displayed image, the data entry system may automatically move the data capture windows placed over the displayed image so that the each data capture window remains in the same position relative to the content of the image while the portion of the image containing the image field data under the data capture window is displayed. If the portion of the image containing the image field data under the data capture window is scrolled so that it is no longer displayed on the screen, the data entry system discontinues displaying the data capture window, but continues to track the movement of the image and the relative location of the image field data. If the image field containing the image field data that was previously under the data capture window is subsequently scrolled back onto the screen, the data entry system again displays the data capture window over the position of the image field data with the image field data visible in the transparent capture data field area of the data capture window.

In some embodiments, the present invention also includes a scanner to scan forms, to provide a complete image acquisition system to scan a paper form to produce a digital image of the form, and input data in the image fields into a data processing application. In such embodiments, the software application may be further adapted to control the scanner, receive the scanned image directly from the scanner, and display the image to the user along with data capture windows as discussed above.

In some embodiments, the system is designed to permit the user to designate a portion of the displayed image as an image field by means other than (or in addition to) dragging a data capture window over the image field. In a preferred embodiment, the designation can be done by employing a touch screen and permitting the user to touch a point on the screen to indicate that the data field includes that touched point. The system then automatically draws a data capture window on the screen surrounding the touched point. In a simple embodiment, the data capture window may initially be made a pre-defined size and be resizable so that the user can resize it to ensure that all the image field data is visible in the image capture window. Preferably the system automatically analyzes the image data near the touched point and calculates the required size and position of the data capture window so that all the image field data is visible in the window. Of course, the user can still adjust the size and position of the data capture window to optimize it, for example if the system does not include in the data capture window all the image field data, in which case the user would expand the window, or includes extra data that is not part of the image field data, in which case the user would reduce the spatial extent of the window.

Alternatively, the user may designate a portion of the image as an image field by using a mouse. For example, the user may place the pointer/cursor over a point in an image field and double-click the left mouse button. In that case, the system would automatically draw a data capture window as described above that includes that point. Alternatively, the system may permit the user to draw a rectangle using the mouse that designates the position in which to place a data capture window. For example, the user may left click at a point near the top left of the field and, holding the left button down, drag the cursor to the bottom right of the field while the system displays a rectangle having vertices at the first top-left position and also at the current cursor position, and when the user releases the left button, the displayed rectangle at that point is then used to size and position the data capture window so that the contents of the rectanglar area are visible in the data capture window.

The system may employ well known optical character recognition methods to analyze the image data near the touched point. In general, the system looks for contiguous strings of characters (including spaces) and sizes and positions the data capture window to encompass all the identified characters that are near each other and near to the touched or otherwise indicated point, for example by requiring that the characters are separated from each other by less than the width of two characters.

Based on knowledge of the nature of the data associated with particular application data fields, the system may also automatically determine the likely field name of the field. An indication of the field name may then be displayed, for example as an icon or text on the border of the data capture window. The user may indicate (to the software) that the selection of the field name is correct simply by not changing it. Otherwise the user may indicate an alternate field name. For example, the user may touch the icon indicating the field name and the system then presents the user with a list of possible field names, from which the user selects one, for example by touching it. In case the system does not, or cannot, determine a probable field name, it may, for example, simply display a generic icon in association with the data capture window, and the user may then be required to expressly indicate the field name, for example by selecting it from a drop-down list. Alternatively, the system may permit the user to drag the cursor from the touched, or otherwise indicated, point on the screen to an indicator of the field name. For example, a data capture window for the date may be placed on the side of the image by the system, and the user may then touch or left click on a spot in the date image field and drag it to the date data capture window. Then the system would draw a data capture window around the designated point, as described above, and designate it as a date field.

In general, the system is programmed to recognize all the common date formats ("MM DD, YYYY", "MM/DD/YY", "DD/MM/YY, etc.). If it recognizes a substring of a string of characters near the touched point as being a date, then the system may draw a date data capture window where only the date is visible in the data capture window. If there is more than one field name corresponding to a date, the system may arbitrarily select one to indicate in association with the data capture window.

By "permitting" a user to perform an action, it is meant that the software/system provides the functional capability to the user to perform the stated action. When this terminology is used, the functionality is such that it is well known to skilled persons as to how to implement such functionality, such as providing the capability for the user to drag a data capture window over a displayed image so that an image field data in the image field in the displayed image is under the capture data field area of the data capture window or moving and resizing such windows.

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.). Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

What is claimed is:

1. A data entry system for extracting data from an image displayed on a screen viewable by a user and associating the extracted data with application data fields, values of which application data fields a data processing application is configured to receive, each application data field having a field name, wherein the image comprises one or more than one image field, each of the image fields being a portion of the image containing image field data, the data entry system comprising a computer processor running a software application, the software application being configured to cause the computer processor to:
   (a) permit the user to designate a portion of the displayed image as one of the image fields;
   (b) in response to the user's designation of the portion of the displayed image as one of the image fields, process the designated portion and convert the image field data in the designated portion to a digital string;
   (c) receive an indication of the field name of the application data field that corresponds to the image field data;
   (d) associate the digital string with the indicated field name of the application data field to create application data field information; and
   (e) provide the application data field information to the data processing application,
   wherein permitting the user to designate the portion of the displayed image as one of the image fields comprises:
   (i) first displaying a movable data capture window on the screen, the data capture window comprising a capture data field area, and then permitting the user to drag the data capture window over the displayed image so that the image field data in the image field in the displayed image is under the capture data field area of the data capture window; or (ii) the user touching or otherwise indicating an image field point within the displayed image to indicate where in the image the image field is located and the computer processor then displaying a data capture window comprising a capture data field area over the displayed image so that the image field data in the image field in the displayed image containing the indicated image field point is under the capture data field area of the data capture window,
   and wherein the data entry system maintains a database of images including the image used to extract the digital string that was provided to the data processing application in the application data field information, along with the location of the data capture window when the system converted the image field data to the digital string.

2. The data entry system of claim 1, wherein permitting the user to designate the portion of the displayed image as one of the image fields comprises first displaying a movable data capture window on the screen, the data capture window comprising a capture data field area, and then permitting the user to drag the data capture window over the displayed image so that the image field data in the image field in the displayed image is under the capture data field area of the data capture window.

3. The data entry system of claim 2, wherein the image comprises a representation of a form for which the data processing application provides a data entry screen to enter application data field values based on image field data in the form, and wherein the software application directly provides the application data field information to the data processing application, indicating to the data processing application that the digital string is a value of the application data field with the field name associated with the digital string, and instructs the data processing application to store the digital string in the same manner as would be done if the user had entered the digital string into a data entry field corresponding to the associated field name in the data entry screen.

4. The data entry system of claim 3, wherein the direct provision of the application data field information to the data processing application is facilitated by use of a software development kit provided by the maker of the data processing application.

5. The data entry system of claim 2, wherein the data capture window further comprises a specification of the field name of one of the application data fields, and the placement of the data capture window over the image field data in the displayed image comprises the indication of the field name of the application data field that corresponds to the image field data, the field name of the application data field being the field name specified by the data capture window.

6. The data entry system of claim 5, wherein the specification of the field name of one of the application data fields comprises an icon positioned near to the capture data field area.

7. The data entry system of claim 5, wherein the specification of the field name of one of the application data fields comprises text positioned near to the capture data field area.

8. The data entry system of claim 2, wherein the image is a representation of a form having a form type and having a total of N image fields, N being an integer greater than or equal to two, the N image fields corresponding to N application data fields associated with the form type within the data processing application, wherein the software application is further configured to cause the computer processor to:
  (a) display N movable data capture windows on the screen, each data capture window having a border and comprising a capture data field area inside the border, and a specification of the field name of one of the application data fields;
  (b) for each data capture window, permit the user to choose the data capture window and drag the data capture window over the displayed image so that the image field data in one of the image fields in the displayed image is under the capture data field area of the data capture window, the choice of data capture window with the specification of the field name of one of the application data fields indicating that image field data contains information corresponding to the application data field having the field name specified in the chosen data capture window;
  (c) for each image field under one of the data capture windows, convert the image field data in the image field to a digital string; and
  (d) associate each of the digital strings with the field name of the indicated application data field to create application data field information.

9. The data entry system of claim 8, wherein the system permits the user to designate a portion of the displayed image as one of the image fields by touching or otherwise indicating a point on the screen to indicate where the image field is located, and the system automatically displays a data capture window encompassing the touched point.

10. The data entry system of claim 8, wherein the software application directly provides the application data field information to the data processing application, indicating to the data processing application that each digital string is a value of the application data field with the field name associated with the digital string in the application data field information, and instructs the data processing application to store the digital strings in the same manner as would be done if the user had entered each digital string into a field corresponding to the associated field name in a data entry screen provided by the data processing application for the form type.

11. The data entry system of claim 8, wherein the capture data field area of each data capture window is transparent so that, after the user drags one of the data capture windows over image field data in the image field, the image field data is visible in the transparent capture data field area of the data capture window.

12. The data entry system of claim 11, wherein, if the user moves or scrolls the displayed image, the data entry system automatically moves the data capture windows placed over the displayed image so that each of the data capture windows remains in the same position relative to the image field data while the portion of the image containing the image field data under the data capture window is displayed.

13. The data entry system of claim 12, wherein, if the image field containing the image field data under the data capture window is scrolled so that it is no longer displayed on the screen, the data entry system discontinues displaying the data capture window, and if the image field containing the image field data that was previously under the data capture window is scrolled back onto the screen, the data entry system again displays the data capture window over the image field data with the image field data visible in the transparent capture data field area of the data capture window.

14. The data entry system of claim 11, wherein the transparent capture data field area of each data capture window is rectangular, having a width and a height, and each data capture window is resizable so that the user can change the width and height of the transparent capture data field area.

15. The data entry system of claim 14, wherein the software application permits the user to confirm that the data capture windows are all correctly placed and sized prior to converting the image field data to digital strings.

16. The data entry system of claim 15, wherein the software application permits the user to confirm that the digital strings are all correct prior to providing the digital strings to the data processing application.

17. The data entry system of claim 8, wherein the conversion of the image field data to the digital strings is done using optical character recognition.

18. The data entry system of claim 8, wherein the data processing application is financial accounting software, and the form type is a vendor invoice.

19. The data entry system of claim 18, wherein one of the application data fields is vendor name and another of the application data fields is amount charged, and the digital string corresponding to the vendor name comprises the name of a vendor of a product, and the digital string corresponding to the amount charged is an amount of money payable to the vendor in respect of the product.

20. The data entry system of claim 18, wherein the data entry system maintains the database of images used to extract the digital strings that were provided to the data processing application in the application data field information, along with the locations of the data capture windows when the system converted the image field data to the digital strings.

21. The data entry system of claim 20, wherein the system generates a unique image identifier for each image, and provides the image identifier as part of the application data field information to the data processing application for entry in an auxiliary application data field, and wherein, when the data processing application is displaying data that was derived from an image processed by the data entry system, the user can request that the system display the image and the system retrieves the corresponding image from the image file database and displays the image.

22. The data entry system of claim 21, wherein the image identifier is entered into an application data field that is displayed by the data processing application when data extracted from the image is displayed, and the system automatically extracts the image identifier and uses it to retrieve the corresponding image from the image file database.

23. The data entry system of claim 21, wherein, when the system displays the image, it also displays the data capture windows in the positions they were when the system converted the image field data to the digital strings.

24. The data entry system of claim 23, wherein the system permits the user to move and resize the data capture windows, after which the system converts the image field data to digital strings and directly provides the application data field information to the data processing application, to replace the application data field information that was previously provided to the data processing application.

25. The data entry system of claim 1, wherein permitting the user to designate the portion of the displayed image as one of the image fields comprises the user touching or otherwise indicating an image field point on the screen to indicate where the image field is located and the computer processor then displaying a data capture window comprising a capture data field area over the displayed image so that the image field data in the image field in the displayed image containing the indicated image field point is under the capture data field area of the data capture window.

26. The data entry system of claim 25, wherein the system permits the user to resize the data capture window to ensure that all the image field data is visible in the capture area data field.

27. The data entry system of claim 25, wherein the system employs optical character recognition to analyze the image field data to determine a location and size of the data capture window so that all the image field data is visible in the data capture window.

28. The data entry system of claim 1, wherein the capture data field area of the data capture window is transparent so that, after the data capture window is positioned over the displayed image, the image field data in the image field in the displayed image is visible in the transparent capture data field area of the data capture window.

29. The data entry system of claim 26, wherein the transparent capture data field area of the data capture window is rectangular, having a width and a height, and the data capture window is resizable so that the user can change the width and height of the transparent capture data field area.

30. The data entry system of claim 29, wherein the software application permits the user to confirm that the data capture window is correctly placed and sized prior to converting the image field data to a digital string.

31. The data entry system of claim 1, wherein the portion of the image under the capture data field area of the data capture window is displayed to the user in a portion of the screen separate from the portion in which the image is displayed.

32. The data entry system of claim 1, wherein the digital string is displayed to the user in a portion of the screen separate from the portion in which the image is displayed.

33. The data entry system of claim 1, wherein the image field data in the image field comprises a character string, where each character is a letter, number, space, newline character or other symbol.

34. The data entry system of claim 33, wherein the conversion of the character string to the digital string is done using optical character recognition.

35. The data entry system of claim 1, wherein the data processing application maintains a list of previously entered values for one of the application data fields that corresponds to the image field data, and the software application is further configured to retrieve the list of previously entered values, determine which value in the list is closest to the digital string, display the closest value, and give the user an option to confirm that the closest value is correct and that it should be provided to the data processing application.

36. The data entry system of claim 35, wherein the software application is further configured to display a list of previously entered values of the application data field, wherein the closest value is highlighted in the list, and the user is given the option to select a different value displayed in the list.

37. A non-transitory computer-readable memory that has a software application stored therein, the software application being configured for use in a data entry system for extracting data from an image displayed on a screen viewable by a user and associating the extracted data with application data fields, values of which application data fields a data processing application is configured to receive, each application data field having a field name, wherein the image comprises one or more than one image field, each of the image fields being a portion of the image containing image field data, the data entry system comprising a computer processor running the software application, the software application being configured to cause the computer processor to:
  (a) permit the user to designate a portion of the displayed image as one of the image fields;
  (b) in response to the user's designation of the portion of the displayed image as one of the image fields, process the designated portion and convert the image field data in the designated portion to a digital string;
  (c) receive an indication of the field name of the application data field that corresponds to the image field data;

(d) associate the digital string with the indicated field name of the application data field to create application data field information; and (e) provide the application data field information to the data processing application, wherein permitting the user to designate the portion of the displayed image as one of the image fields comprises: (i) first displaying a movable data capture window on the screen, the data capture window comprising a capture data field area, and then permitting the user to drag the data capture window over the displayed image so that the image field data in the image field in the displayed image is under the capture data field area of the data capture window; or (ii) the user touching or otherwise indicating an image field point within the displayed image to indicate where in the image the image field is located and the computer processor then displaying a data capture window comprising a capture data field area over the displayed image so that the image field data in the image field in the displayed image containing the indicated image field point is under the capture data field area of the data capture window, and wherein the data entry system maintains a database of images including the image used to extract the digital string that was provided to the data processing application in the application data field information, along with the location of the data capture window when the system converted the image field data to the digital string.

* * * * *